United States Patent
Lust et al.

[11] Patent Number: 5,938,988
[45] Date of Patent: Aug. 17, 1999

[54] MULTIPLE OPTICAL CURVE MOLDS FORMED IN A SOLID PIECE OF POLYMER

[75] Inventors: Victor Lust; Daniel G. Boone; Robert E. LaBelle, all of Jacksonville, Fla.; Dennis M. Jones, Shrewsbury; Robert G. Petit, Phillipston, both of Mass.

[73] Assignee: Johnson & Johnson Vision Products, Inc., Jacksonville, Fla.

[21] Appl. No.: 08/699,629

[22] Filed: Aug. 19, 1996

[51] Int. Cl.[6] .................................................. B29D 11/00
[52] U.S. Cl. .......................... 264/2.5; 264/2.2; 264/219; 425/808
[58] Field of Search .............................. 264/2.5, 2.2, 219, 264/220, 297.2, 297.8, 1.1; 425/808; 249/122, 125

[56] References Cited

U.S. PATENT DOCUMENTS

| | | | |
|---|---|---|---|
| 4,254,065 | 3/1981 | Ratkowski | 264/2.5 |
| 4,284,591 | 8/1981 | Neefe | 264/1.1 |
| 4,565,348 | 1/1986 | Larsen | 249/122 |
| 5,545,366 | 8/1996 | Lust et al. | 264/2.5 |

*Primary Examiner*—Matthieu D. Vargot

[57] ABSTRACT

An injection molding process for molding an assembly of a frontcurve molds in a plurality of unitary solid piece of polymer in which plurality of frontcurve molds are arranged symmetrically around a single center polymer injection gate. In this arrangement the molten polymer flows radially outwardly therefrom uniformly in all directions to the four frontcurves to form one common molded piece of polymer. In a compression injection molding process, the pressure on the molten polymer is maintained relatively constant, and the mold is mechanically collapsed during the molding operation. The present invention molds an assembly of frontcurve molds in a manner in which there is a significant reduction of residual stress locked into the resultant assembly of frontcurve molds. This results in a significant reduction in warpage and shrinkage of each frontcurve mold, which is not optically stressed, and results in a subsequent casting of an ophthalmic lens which is not optically stressed. Moreover, the assembly of frontcurve molds can function as its own support pallet for product placement and alignment purposes during subsequent production operations.

10 Claims, 2 Drawing Sheets

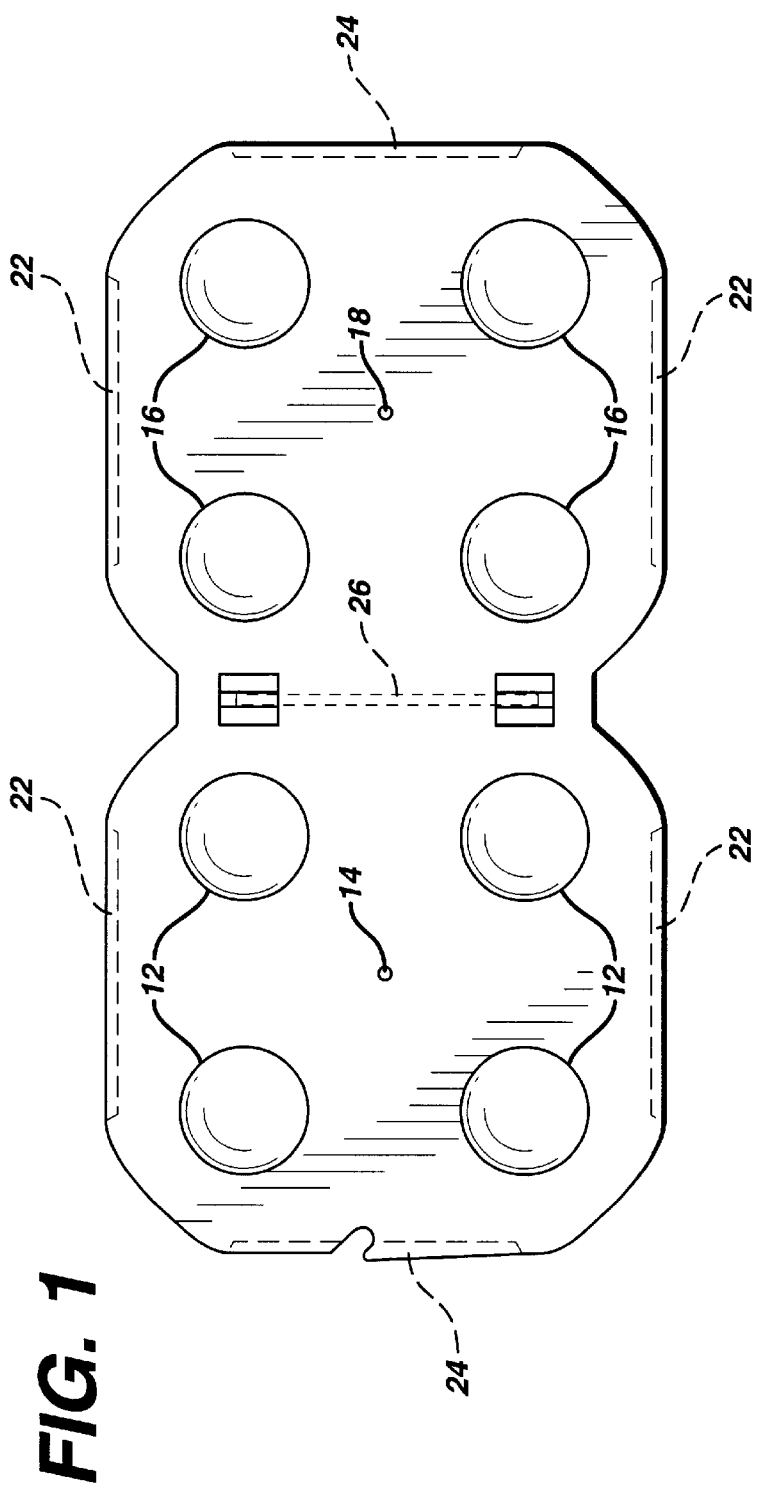
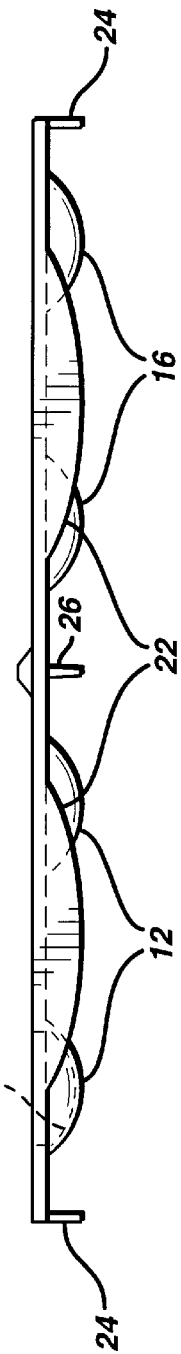
FIG. 1
FIG. 2

MULTIPLE OPTICAL CURVE MOLDS FORMED IN A SOLID PIECE OF POLYMER

BACKGROUND OF THE INVENTION

1. Field of the Invention

The present invention relates generally to a multiple assembly of optical curve molds formed in a single solid piece of polymer, and more particularly pertains to a multiple assembly of frontcurve molds formed in a single solid piece of polymer in which the assembly of frontcurve molds is used in a subsequent production process for molding cast ophthalmic lenses in mold assemblies, each comprising a frontcurve and a spaced basecurve, and wherein a molded lens such as a contact lens is formed therebetween.

2. Discussion of the Prior Art

As the ophthalmic lens industry has grown, and in particular the industry related to supplying contact lenses which are provided for periodic frequent replacement, the number of contact lenses required to be produced has increased dramatically. This has spurred manufacturers to strive for automated methods and apparatus which are adaptable to automated practices and consistent performance.

It is generally known in the prior art to make ophthalmic lenses, such as soft hydrogel contact lenses, by molding a monomer or monomer mixture in a mold such as one made from polystyrene or polypropylene.

Examples of this prior art can be found in U.S. Pat. Nos. 5,039,459, 4,889,664 and 4,565,348. These patents discuss therein the requirement for a polystyrene mold in which the materials, chemistry and processes are controlled such that the mold portions do not require undue force to separate by sticking to the lens or to each other. In contrast to the above polystyrene molds, another example is the use of polypropylene or polyethylene molds as described in U.S. Pat. No. 4,121,896.

The mold assembly to mold an ophthalmic contact lens typically includes a lower concave mold portion referred to as a frontcurve and an upper convex mold portion referred to as a basecurve. The concave surface of the lower frontcurve and the convex surface of the upper basecurve define therebetween a mold cavity for a contact lens.

SUMMARY OF THE INVENTION

Accordingly, it is a primary object of the present invention to provide a multiple assembly of optical curve molds formed in a single solid piece of polymer in which the assembly of optical curve molds is used in a subsequent production process for molding cast ophthalmic lenses in mold assemblies, each comprising a frontcurve and a spaced basecurve, and wherein a molded lens such as a contact lens is formed therebetween.

The present invention concerns an injection molding process for molding an assembly of a plurality of frontcurve molds in a unitary solid piece of polymer in which four frontcurve molds are arranged symmetrically around a single center polymer injection gate. In this arrangement the molten polymer, plastic melt flows radially outwardly therefrom relatively uniformly in all directions to the four frontcurves to form one common molded piece of polymer. In a compression injection molding process, the pressure on the molten polymer is maintained relatively constant, and the mold is mechanically collapsed during the molding operation.

Pursuant to the teachings of the present invention, the molten polymer flows through the injection gate orifice to flow into and fill the assembly mold in a uniform, consistent, laminar manner, which results in the shear stress being within acceptable limits, to provide for uniform shrinkage and warp-free optical curve molds having uniform physical characteristics and acceptable optical properties.

The present invention molds an assembly of frontcurve molds in a manner in-which there is a significant reduction of residual stress locked into the resultant assembly of frontcurve molds. This results in a significant reduction in warpage and shrinkage of each frontcurve mold, which is not optically stressed, and results in a subsequent casting of an ophthalmic lens which is not optically stressed.

Moreover, the assembly of frontcurve molds can function as its own support pallet for product placement and alignment purposes during subsequent production operations. This eliminates a production requirement for support pallets to position and align the separate frontcurve molds, as each separate frontcurve mold is precisely positioned and aligned by the assembly of frontcurve molds. This results in a significant reduction in the complexity of the product handling requirements of the production operations.

A preferred embodiment of the present invention molds an assembly of frontcurve molds, however the present invention is equally capable of molding an assembly of basecurve molds in a single solid piece of polymer in an alternative embodiment.

The present invention concerns injection molding a generally round shape curve with somewhat standard processing parameters. The design of the present invention eliminates problems encountered with prior art designs in areas of stress, differential shrinkage (football effect), assembly, uniformity between lenses and parts, and cost.

The design of the present invention provides a center polymer injection gate, and four lense molds positioned symmetrically therearound. The molded part can be designed with dimensions conforming to those of existing parts, and therefore an existing hydration unit and operation can remain unchanged in the present production line.

In accordance with the teachings herein, the present invention provides an injection molding process for molding an assembly of a plurality of optical curve molds in a single unitary solid piece of polymer in which an assembly mold defines a plurality of optical curve molds arranged symmetrically around a single center polymer injection gate. In this arrangement, the molten polymer flows substantially uniformly radially outwardly therefrom in all directions to the plurality of optical curve molds to form one common molded piece of polymer formed within the assembly mold. This results in a significant reduction in the amount of residual stress locked into each optical curve mold, and a significant reduction in warpage and shrinkage of each optical curve mold, and results in a subsequent casting of an ophthalmic lens which is not optically stressed.

In greater detail, the assembly mold preferably includes four optical curve molds positioned symmetrically about the center polymer injection gate. During a compression injection molding operation the pressure on the molten polymer is maintained relatively constant, and the assembly mold is mechanically collapsed to cause a volumetric shrinkage in the assembly mold. Moreover, the assembly of optical curve molds can function as its own support pallet for product placement and alignment purposes during subsequent production operations, thereby eliminating a production requirement for support pallets to position and align separate optical curve molds, as each separate optical curve mold is precisely positioned and aligned by the assembly of optical curve molds. A preferred embodiment of the present invention molds an assembly of frontcurve molds, however the present invention is equally capable of molding an assembly of basecurve molds in a single solid piece of polymer in an alternative embodiment.

BRIEF DESCRIPTION OF THE DRAWINGS

The foregoing objects and advantages of the present invention for a multiple assembly of optical curve molds formed in a single solid piece of polymer may be more readily understood by one skilled in the art with reference being had to the following detailed description of a preferred embodiment thereof, taken in conjunction with the accompanying drawings wherein like elements are designated by identical reference numerals throughout the several views, and in which:

FIG. 1 is a top plan view of a single solid piece of molded polymer molded pursuant to the teachings of the present invention in a compression injection molding process in which two sets of four frontcurves are each molded symmetrically around a center polymer injection gate;

FIG. 2 is a side elevational view of the molded polymer frontcurve mold assembly of FIG. 1;

DETAILED DESCRIPTION OF THE DRAWINGS

Figure 3:
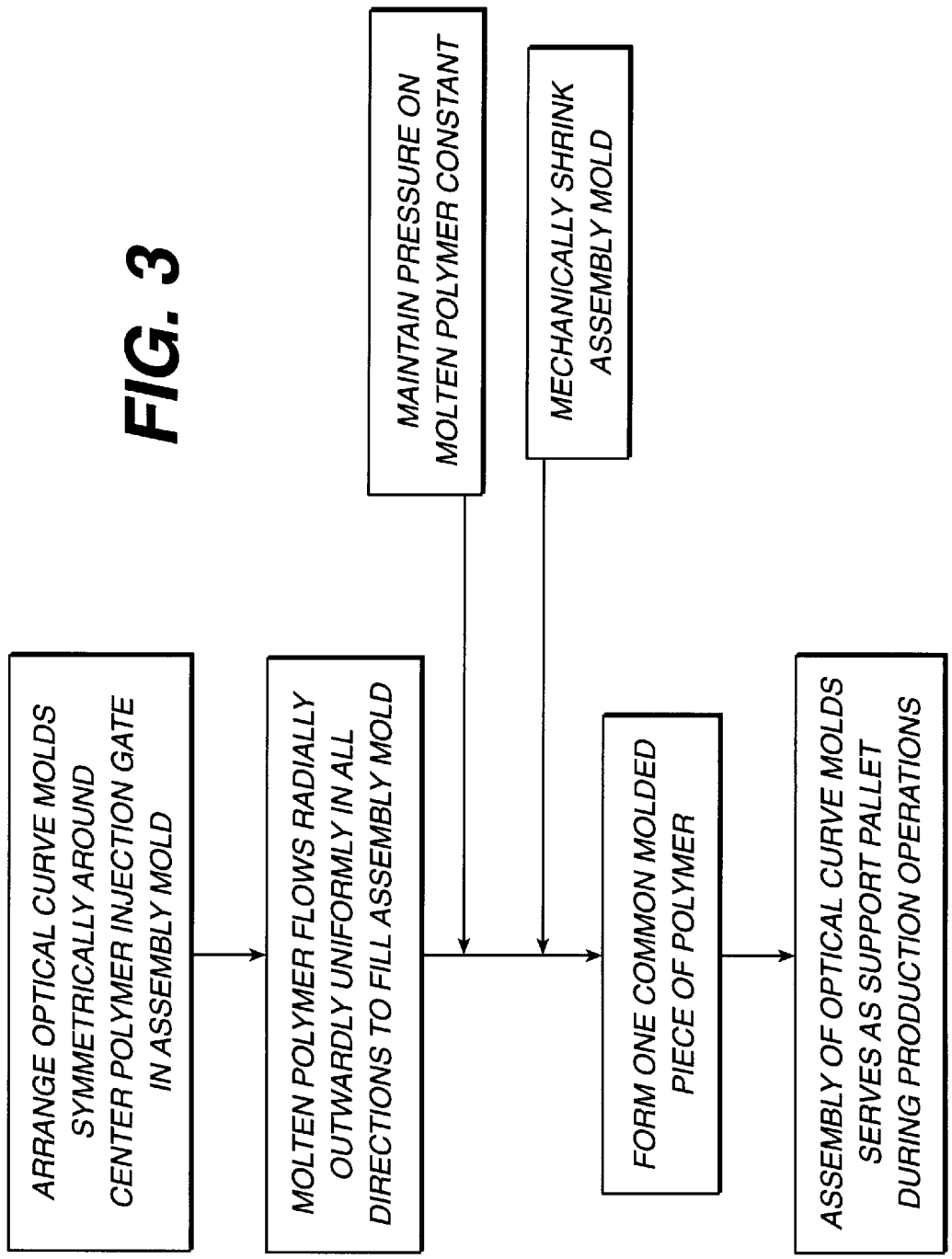
FIG. 3 is a process flow diagram illustrating the major steps of the present invention.

The present invention concerns injection molding of generally round shaped curves with somewhat standard processing parameters, and eliminates problems with prior art designs in areas of stress, differential shrinkage (football effect), assembly, uniformity between lenses and parts, and cost. More particularly the present invention concerns a compression injection molding process for molding an assembly of a multiple number of frontcurve molds in a single unitary solid piece of polymer. Four frontcurve molds are arranged symmetrically around a single center polymer injection gate, and the molten polymer plastic melt flows radially outwardly therefrom to the four surrounding frontcurve molds to form one common unitary, single molded piece of polymer. In such a compression injection molding process, the pressure on the molten polymer is maintained relatively constant, and the mold is mechanically collapsed during the molding operation, as is generally known in the art.

Referring to the drawings in detail, FIG. 1 is a top plan view, and FIG. 2 is a side elevational view, of a single solid piece of molded polymer 10 forming an assembly of frontcurve molds, molded pursuant to the teachings of the present invention in a compression injection molding process. In the embodiment of FIGS. 1 and 2, a first set of four frontcurve molds 12 is molded symmetrically about a first center polymer injection gate positioned at 14, and a second set of four frontcurve molds 16 is also molded symmetrically about a second center polymer injection gate positioned at 18.

Each front mold curve 12 or 16 defines an inner concave surface 20, FIG. 2, which when the frontcurve mold is assembled with a corresponding basecurve mold, forms the front surface of a contact lens molded between the assembly of frontcurve and basecurve molds.

The assembly 10 includes a plurality of four downwardly depending front and back legs 22, two downwardly depending side legs 24, and a downwardly depending center leg 26, provided to support the assembly on a flat surface. However, it should be understood that the assembly 10 in its simplest form can take any near circular shape with or without support legs, although support legs are normally required in some form.

In different embodiments the plurality of frontcurve molds can include any desirable number of frontcurve molds arranged symmetrically around the center polymer injection gate.

The present invention molds an assembly of frontcurve molds in a manner in which there is a significant reduction in the amount of residual stress locked into each frontcurve mold. This results in a significant reduction in warpage and shrinkage of each frontcurve mold, which is not optically stressed, and results in a subsequent casting of an ophthalmic lens which is not optically stressed.

Moreover, the assembly of frontcurve molds can function as its own support pallet for product placement and alignment purposes during subsequent production processes. This eliminates a production requirement for support pallets to position and align the separate frontcurve molds, as each separate frontcurve mold is precisely positioned and aligned by the assembly of frontcurve molds. This results in a significant reduction in the complexity of the product handling requirements of the production process. Additionally, the molded part can be designed with dimensions to occupy exactly the same amount of room as existing parts, and therefore, with the adoption of an assembly of frontcurve molds in the present contact lens production line, there is no need to change the existing hydration unit and process in the present production line.

A series of 13 sequential time measurements were taken during compression injection molding of an assembly of four frontcurves molded in a single piece of polymer, similar to those illustrated in one half of FIGS. 1 and 2, on nodal to nodal time measurements, nodal to nodal pressure measurements, nodal to nodal temperature measurements, and element shear stress measurements for 13 sequential time measurements. The measurements and analysis demonstrated the conditions as being very good for the process of the present invention.

While several embodiments and variations of the present invention for a multiple assembly of optical curve molds formed in solid piece of polymer are described in detail herein, it should be apparent that the disclosure and teachings of the present invention will suggest many alternative designs to those skilled in the art.

What is claimed is:

1. An injection molding process for molding an assembly of a plurality of optical curve molds in a single unitary solid piece of polymer, comprising the steps of arranging a plurality of optical curve molds symmetrically around a single center polymer injection gate in an assembly mold and causing the molten polymer to flow radially outwardly therefrom through the assembly mold to each of the plurality of optical curve molds to form one common molded piece of polymer, resulting in a significant reduction in the amount of residual stress locked into each optical curve mold, and a significant reduction in warpage and shrinkage of each optical curve mold, which further results in a subsequent casting of an ophthalmic lens which is not optically stressed.

2. An injection molding process as claimed in claim 1, comprising a compression injection molding process during which the pressure on the molten polymer is maintained relatively constant, and wherein the assembly mold is mechanically collapsed to cause a volumetric shrinkage of the assembly mold during the molding operation.

3. An injection molding process as claimed in claim 2, wherein the assembly of optical curve molds functions as its own support pallet for product placement and alignment purposes during subsequent production operations, thereby eliminating a production requirement for support pallets to position and align separate optical curve molds, as each optical curve mold is precisely positioned and aligned by the assembly of optical curve molds.

4. An injection molding process as claimed in claim 3, comprising a process for molding an assembly of optical frontcurve molds in a single unitary solid piece of polymer.

5. An injection molding process as claimed in claim 3, comprising a process for molding an assembly of basecurve molds in a single unitary solid piece of polymer.

6. An injection molding process as claimed in claim 3, wherein the assembly mold includes four optical curve molds positioned symmetrically about the center polymer injection gate.

7. An injection molding process as claimed in claim 1, wherein the assembly of optical curve molds functions as its own support pallet for product placement and alignment purposes during subsequent production operations, thereby eliminating a production requirement for support pallets to position and align separate optical curve molds, as each optical curve mold is precisely positioned and aligned by the assembly of optical curve molds.

8. An injection molding process as claimed in claim 1, comprising a process for molding an assembly of frontcurve molds in a single unitary solid piece of polymer.

9. An injection molding process as claimed in claim 1, comprising a process for molding an assembly of basecurve molds in a single unitary solid piece of polymer.

10. An injection molding process as claimed in claim 1, wherein the assembly mold includes four optical curve molds positioned symmetrically about the center polymer injection gate.

* * * * *